United States Patent [19]

Burnell

[11] 3,931,455
[45] Jan. 6, 1976

[54] BREATHER CAP WITH BAFFLE

[75] Inventor: Norman Burnell, Hallandale, Fla.

[73] Assignee: Lumidor Products, Corporation, Hialeah, Fla.

[22] Filed: Mar. 25, 1974

[21] Appl. No.: 454,512

[52] U.S. Cl................. 174/135; 98/122; 174/16 R; 220/374
[51] Int. Cl.² ....................................... H02G 15/00
[58] Field of Search .......... 174/14 R, 16 R, 17 VA, 174/135; 200/150 H; 98/1, 122; 137/216; 220/44 A, DIG. 27; 285/153, DIG. 25

[56] References Cited
UNITED STATES PATENTS

| | | | |
|---|---|---|---|
| 1,015,955 | 1/1912 | Helder | 200/150 H UX |
| 3,072,284 | 1/1963 | Luhman, Jr. | 220/44 A |
| 3,422,982 | 1/1969 | Terwoerds et al. | 220/44 A |
| 3,564,119 | 2/1971 | Thompson et al. | 174/135 |
| 3,655,905 | 4/1972 | Ray | 174/16 R X |
| 3,694,566 | 9/1972 | Thompson et al. | 174/135 |

*Primary Examiner*—Laramie E. Askin
*Attorney, Agent, or Firm*—Caesar, Rivise, Bernstein & Cohen

[57] ABSTRACT

In an electrical cable having an impervious sheath thereabout defining a space between the cable and the sheath, a breather cap assembly is provided to enable the space between the cable and the sheath to be in free communication with the ambient atmosphere surrounding the sheath, while serving to prevent the ingress of water into the space. The breather cap assembly comprises a nipple which is threadedly secured to the sheath and includes an orifice extending longitudinally therethrough. A slot is provided in the end of the nipple and in communication with the orifice to prevent the orifice from being blocked inside the sheath. The other end of the nipple is threadedly secured to baffle means. The baffle means is a hollow member including an open end disposed furthest away from the nipple means and having a planar baffle staked within the interior of the baffle means and a cup-shaped baffle press fit therein and adjacent the opening. The planar baffle includes an opening coaxial with the orifice and the cup-shaped baffle includes plural openings disposed laterally of the axis of the orifice. The two baffles serve to increase the distance along the interior of the baffle means that water must traverse to reach the orifice and hence enter the sheath of the cable.

6 Claims, 4 Drawing Figures

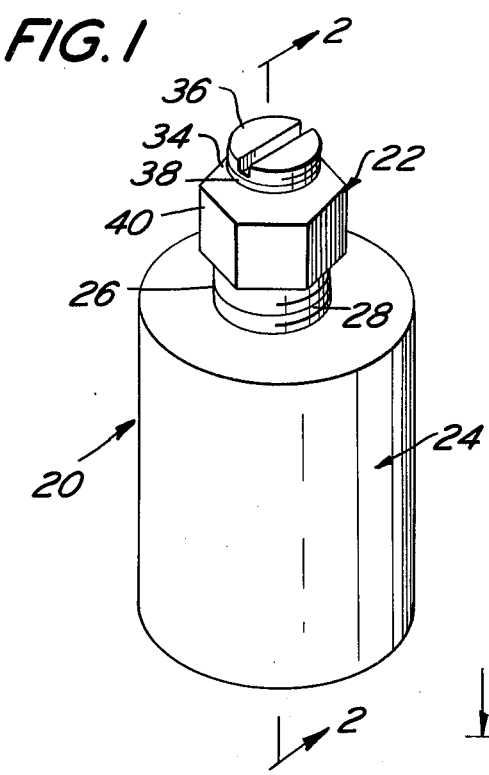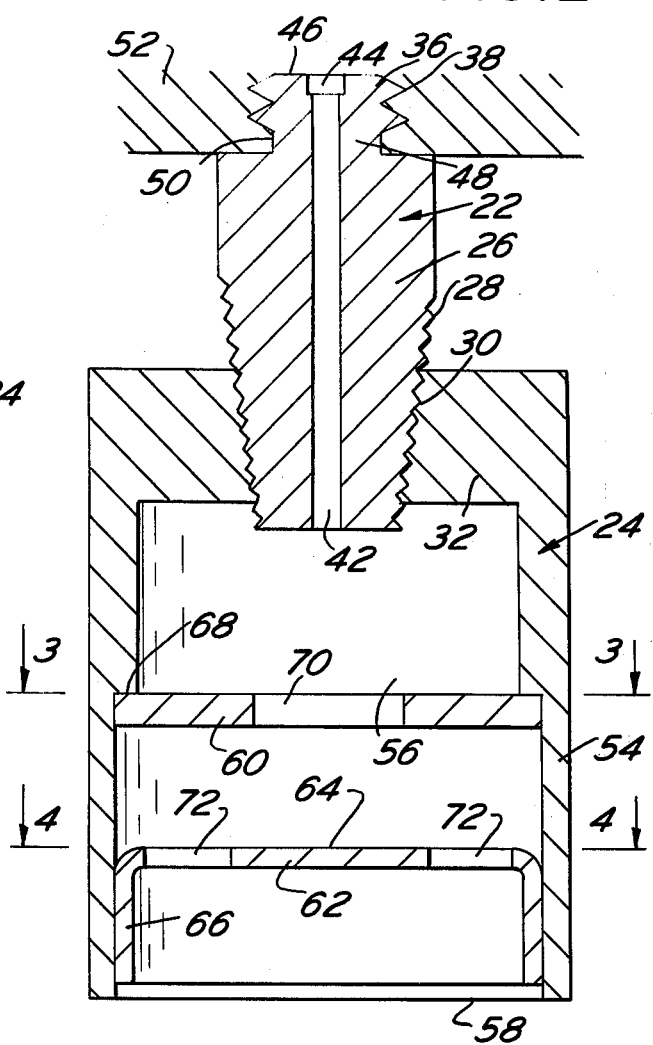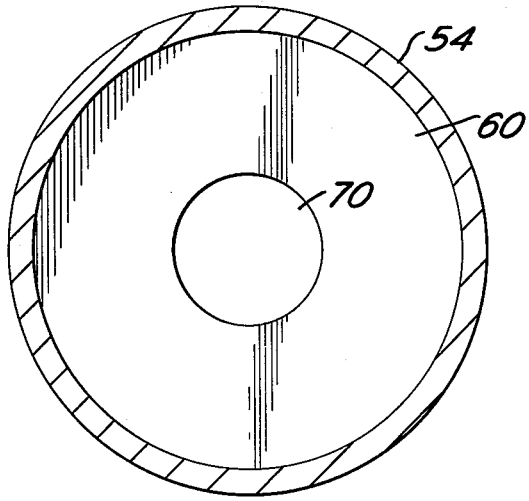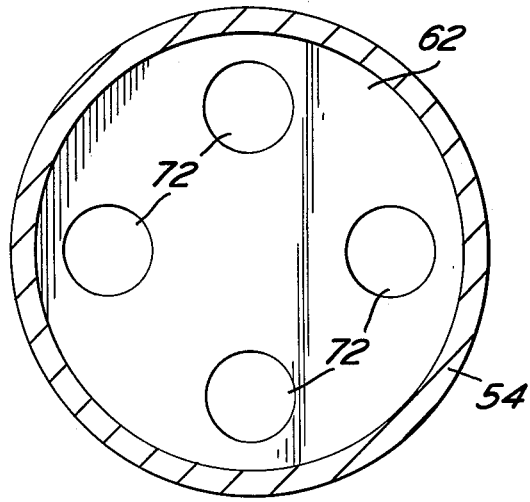

BREATHER CAP WITH BAFFLE

This invention relates generally to electrical cables having breather cap assemblies and more particularly to a breather cap assembly for use with electrical cables for enabling the space within the cable to be in free communication with the ambient atmosphere surrounding the cable while serving to prevent the ingress of water into said space.

Electrical cables, when used outdoors, are usually provided with an impervious sheathing. For example, cables of electrical conductors utilized by telephone companies have lead sheaths disposed thereabout. The sheath defines a space between the interior surface thereof and the cable disposed therein.

In order to prevent undesirable pressure differentials between the space within the sheath and the ambient atmosphere surrounding the sheath, it is a practice to provide an opening aperture in the sheath to thereby enable the free intake and exhaust of air between the interior of the sheath and the surrounding environment as the temperatures change.

In co-pending application Ser. No. 302,338 (now U.S. Pat. No. 3,811,006, assigned to the same assignee as this invention, there is disclosed a novel breather cap which is adapted for use with pressurized cables having conventional valve assemblies. In such cable systems, the valve is normally biased closed and commonly includes a valve pin or stem which, when depressed, enables a pressurized gas, e.g. air, to be supplied through the valve to the interior space in the sheathing.

Prior to the invention as disclosed and claimed in the aforementioned co-pending application, in order to convert a pressurized cable to an unpressurized cable, it was necessary to remove the valve assembly from the associated valve housing to provide an open aperture in the sheath and thereby enable free intake and exhaust of air between the interior of the sheath and the surrounding environment.

In said aforementioned co-pending application, a new and improved breather cap is disclosed and claimed for use with a pressure valve in a sheathed electrical cable. To that end, the cap member is adapted for securement to the valve and acts to depress the valve when so secured, to thereby provide open communication between the interior of the sheath and the ambient atmosphere.

As will be appreciated by those skilled in the art, it is of considerable importance to prevent the ingress of water into the cable through the opening in the sheathing thereof or through the breather cap. Due to the arrangement of the breather cap, as disclosed and claimed in the aforementioned co-pending application, water is effectively precluded from gaining access to the interior of the sheathing through the breather cap when the valve stem of the breather valve is depressed.

In applications wherein the breather cap, as disclosed and claimed in the aforementioned co-pending application, is not of particular utility, that is, in applications wherein the cable is unpressurized and hence does not include a pressure valve, but rather only includes an opening or venting means to provide free access to the interior of the sheathing, it is also of considerable importance to preclude the ingress of water into the interior of the sheathing through such opening or venting means.

Accordingly, it is a general object of this invention to provide a breather cap assembly for use with an electrical cable having a sheath thereabout, which sheath defines a space therein and with the breather cap assembly arranged to enable the space to be in free communication with the ambient atmosphere surrounding the outside of the sheath, while precluding the ingress of water into the interior thereof.

It is a further object of this invention to provide a relatively small, simple and inexpensive breather cap assembly.

These and other objects of this invention are achieved by providing a breather cap assembly for use with an electrical cable having an impervious sheath thereabout, which sheath defines a space therebetween. The breather cap assembly is arranged to enable the space to be in free communication with the ambient atmosphere surrounding the outside of the sheath, while serving to prevent the ingress of water into the space. To that end, the breather cap assembly comprises nipple means for securement to the sheath and including an orifice extending therethrough and hollow baffle means connected to the nipple means. The orifice in the nipple means is in communication with the interior of the baffle means. The baffle means includes an open end disposed furthest away from the nipple means and means disposed within the interior of the baffle means for increasing the distance along the interior thereof that water must traverse to reach the orifice.

Other objects and many of the attendant advantages of this invention will be readily appreciated as the same becomes better understood by reference to the following detailed description when considered in connection with the accompanying drawings wherein:

FIG. 1 is a perspective view of a breather cap assembly in accordance with this invention;

FIG. 2 is an enlarged sectional view taken along line 2—2 of FIG. 1;

FIG. 3 is a sectional view taken along line 3—3 of FIG. 2; and

FIG. 4 is a sectional view taken along line 4—4 of FIG. 2.

Referring now in greater detail to the various figures of the drawings wherein like reference numerals refer to like parts, a breather cap assembly embodying the invention is shown generally at 20 in FIG. 1.

As can be seen, the breather cap basically comprises a nipple means 22 and baffle means 24.

The nipple means 22 comprises a first end 26 which is tapered (see FIG. 2) and which includes a plurality of threads cut in the outside surface thereof. The threads 28 are adapted to be threadedly engaged with internal threads 30 cut into an end wall 32 of baffle means 24. When the threads 28 and 30 are in mating relationship, the nipple means 22 is securely connected to the baffle means 24.

The other end of the nipple means is denoted by the reference numeral 34 and includes a cylindrical portion 36 (see FIG. 2) having a plurality of threads 38 cut in the exterior surface thereof.

The intermediate portion of the nipple means is denoted by the reference numeral 40 and is of overall hexagonal shape (see FIG. 1).

As can be seen in FIG. 2, an orifice 42 extends through the entire length of the nipple means 22. A slot 44 is cut into the end face 46 of the end 36 and is in communication with the orifice 42 at end 34. The purpose of the slot 44 will be described in detail later. Between the hexagonal portion 40 and the threaded cylindrical portion 36 of nipple means 22 is a cylindrical undercut portion 48.

The nipple means 22 is arranged to be screwed into an opening 50 in the sheathing 52 of an armored cable such that the space (not shown) within the sheathing and between the cable conductors (not shown) is in free communication with the end of orifice 42. The slot 44 serves to ensure that the end of orifice 42, which extends within the sheathing, is not blocked.

As will be appreciated by those skilled in the art, the orifice 42 serves as a means for enabling the space (not shown) within the sheathing to be in free communication with the ambient atmosphere surrounding the outside of the sheathing.

In order to prevent the ingress of water into the orifice 42 and hence to the interior of the sheathing 52, the baffle means 24 is provided.

As can be seen in FIGS. 1 and 2, the baffle means 24 is of cylindrical shape and includes an end wall 32 and a cylindrical side wall 54 enclosing a hollow space 56 in the interior thereof. The end opposite end wall 32 is open and is denoted by the reference numeral 58.

Since end 58 is open and is therefore in communication with the interior 56 of baffle means 24, and hence with the communicating orifice 42 in the connected nipple means 22, means are provided for increasing the distance along the interior surface of the baffle means along which water must traverse to reach the orifice 42.

As can be seen in FIG. 2, those means comprise a first planar baffle 60 and a second cup-shaped baffle 62. The cup-shaped baffle 62 includes a planar portion 64 and a cylindrical side wall 66. The baffles 60 and 62 are mounted such that the planar portion of each baffle is disposed normally to the longitudinal axis of the baffle means, which axis is coaxial with the axis of the orifice 42.

The baffle 60 is disposed within the interior of the baffle means 24 and is closest to the nipple means 22. The baffle 60 is held in place on a ledge 68 cut into the interior surface of side wall 54 and is staked in place by plural dimpled protrusions (not shown).

The cup-shaped baffle 62 is disposed closest to the open end 58 of baffle means 24 and is press fit with the side wall 66 firmly abutting the interior surface of the side wall 54 and slightly spaced from the open end 58.

As can be seen in FIGS. 2 and 3, a circular opening 70 is provided in the center of planar baffle 60. The opening 70 is coaxial with the longitudinal axis of the baffle and hence with the axis of orifice 42.

As can be seen in FIGS. 2 and 4, a plurality of openings 72 are provided in the planar portion 64 of baffle 62. In a preferred embodiment of the invention the openings 72 are four in number and are equally spaced about the periphery of baffle 62 and at the same distance from the longitudinal axis of the baffle means 24.

With the baffle means disposed and arranged as described above, it should be appreciated by those skilled in the art that the distance that water must travel to the orifice 42 upon entrance through opening 58 is significantly lengthened by the position of the baffles and the unaligned openings disposed therein. For example, in order to reach orifice 42, water entering opening 58 must flow along the inside surface of side wall 54, then along the inside surface of side wall 66 of baffle 62, through any of the openings 72 disposed therein, from the opening 72 along the underside surface of the cup-shaped baffle 62 to the inside surface of side wall 54 contiguous therewith, along the inside surface of that side wall poriton to one side surface of planar baffle 60, radially inward along said surface to the opening 70, through the opening 70, and radially outward along the other surface of the planar baffle 60 to the inside surface of the sidewall 54 and from there to the inside surface of end wall 32 and from there to the interior of orifice 42.

In accordance with this invention, a one inch breather cap with the baffles as shown provides the same protection against the ingress of water to orifice 42 as does a four inch long conventional breather cap.

As should be appreciated by those skilled in the art, the breather cap assembly of this invention is extremely simple in construction, is small and compact in size, and enables the free communication of the ambient atmosphere surrounding the sheath to the space within the sheath, while deterring the ingress of water into the interior of the sheath.

Without further elaboration, the foregoing will so fully illustrate my invention that others may, by applying current or future knowledge, readily adapt the same for use under various conditions of service.

What is claimed as the invention is:

1. A breather cap assembly for use with an electrical cable having an impervious sheath thereabout which sheath defines a space between it and said cable, said sheath including a threaded opening therein in communication with said space, said breather cap assembly being arranged for securement to said cable sheath to enable said space to be in free communication with the ambient atmosphere surrounding the outside of the sheath, while serving to prevent the ingress of water into said space, said breather cap assembly comprising hollow baffle means and nipple means secured thereto and including one threaded end for securement within said threaded opening in said sheath, said nipple means including an orifice extending therethrough and in communication with the interior of the baffle means, said baffle means having a central longitudinal axis and including an open free end disposed furthest from said nipple means and first and second baffles mounted within the interior of said baffle means and normal to said central axis for increasing the distance along the interior of said baffle means that water must traverse to reach said orifice, said first baffle including an opening on said central axis and said second baffle including plural openings laterally offset and spaced about said central axis, said threaded end of the nipple means including an end face through which said orifice extends and an enlarged slot cut in said face for substantially the full width of said face and in communication with said orifice to ensure that free communication between the space within the cable sheath and the ambient atmosphere is not blocked when said breather cap assembly is secured to said cable.

2. The breather cap assembly of claim 1 wherein said first baffle is planar and wherein said second baffle is cup-shaped.

3. The breather cap assembly of claim 2 wherein said plural openings are equally spaced from said central axis.

4. The breather cap assembly of claim 3 wherein said cup-shaped baffle is press fit within the interior of said baffle means.

5. The breather cap assembly of claim 4 wherein the interior of said baffle means includes a ledge against which said planar baffle abuts, with said planar baffle being staked in place.

6. The breather cap assembly of claim 5 wherein said cup-shaped baffle is disposed closest to the open end of said baffle means.

* * * * *